US009410594B2

(12) United States Patent
Shereyk et al.

(10) Patent No.: US 9,410,594 B2
(45) Date of Patent: Aug. 9, 2016

(54) DAMPENING MECHANISM FOR COAXIALLY ALIGNED RELATIVELY TRANSLATABLE COMPONENTS

(71) Applicant: ILLINOIS TOOL WORKS INC., Glenview, IL (US)

(72) Inventors: David A. Shereyk, Homewood, IL (US); John S. Pontaoe, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/387,851

(22) PCT Filed: Mar. 26, 2013

(86) PCT No.: PCT/US2013/033805
§ 371 (c)(1),
(2) Date: Sep. 25, 2014

(87) PCT Pub. No.: WO2013/148628
PCT Pub. Date: Oct. 3, 2013

(65) Prior Publication Data
US 2015/0048235 A1     Feb. 19, 2015

Related U.S. Application Data

(60) Provisional application No. 61/616,725, filed on Mar. 28, 2012.

(51) Int. Cl.
| F16F 7/00 | (2006.01) |
| F16F 1/38 | (2006.01) |
| B25G 1/01 | (2006.01) |
| B25G 1/04 | (2006.01) |
| F16F 1/46 | (2006.01) |
| F16F 1/377 | (2006.01) |
| F16F 15/08 | (2006.01) |
| F16B 7/14 | (2006.01) |

(52) U.S. Cl.
CPC ............... *F16F 1/3814* (2013.01); *B25G 1/01* (2013.01); *B25G 1/04* (2013.01); *F16F 1/377* (2013.01); *F16F 1/46* (2013.01); *F16F 15/08* (2013.01); *F16B 7/14* (2013.01)

(58) Field of Classification Search
CPC ............ F16F 1/377; F16F 15/08; F16F 1/36; F16F 7/087; F16B 7/14
USPC ................. 248/608, 635, 900, 607, 636, 569; 403/365, 351, 223, 224, 227, 228, 226, 403/372, 203; 267/141.1, 141.2, 141.3; 188/371, 266
See application file for complete search history.

(56) References Cited

U.S. PATENT DOCUMENTS 2,716,566 A    8/1955   Thiry
3,781,073 A * 12/1973   Jorn et al. ..................... 384/291
(Continued)

FOREIGN PATENT DOCUMENTS

| DE | 102007021628 A1 | 11/2008 |
| WO | 00/05507 A1 | 2/2000 |
| WO | 2006047413 A2 | 5/2006 |

OTHER PUBLICATIONS

ISR and WO for PCT/US2013/033805 mailed Sep. 6, 2013.

*Primary Examiner* — Kimberly Wood

(57) ABSTRACT

A dampening mechanism includes a pair of coaxially aligned inner and outer components with ends disposed in telescoping relation with an interposed resilient elastomeric member comprising a monolithic polymeric structure comprising a hollow body within the end of the outer component, and receiving the end of the inner component with the body including an attachment portion secured to the outer component, and a support portion supporting the inner component. The body portion includes a plurality of equally spaced webs extending between the attachment portion and support portion. In one form, the body is generally cylindrical and disposed between the inner surface of the outer component and the outer surface of the inner component in telescoping relation and frictionally engaging the telescoping components.

19 Claims, 4 Drawing Sheets

(56) References Cited

U.S. PATENT DOCUMENTS

| | | | |
|---|---|---|---|
| 4,818,135 A * | 4/1989 | Desjardins | F16B 7/1472 248/413 |
| 4,854,642 A * | 8/1989 | Vidwans et al. | 297/410 |
| 4,858,866 A | 8/1989 | Werner | |
| 5,375,938 A * | 12/1994 | Bartlow | 403/202 |
| 5,823,699 A * | 10/1998 | Austin et al. | 403/109.1 |
| 5,931,598 A * | 8/1999 | Wang | 403/351 |
| 6,079,894 A | 6/2000 | Obitts | |
| 2012/0153536 A1 | 6/2012 | Coffield et al. | |

\* cited by examiner

DAMPENING MECHANISM FOR COAXIALLY ALIGNED RELATIVELY TRANSLATABLE COMPONENTS

CROSS-REFERENCE TO RELATED APPLICATION

This application is a National Phase of International Application Number PCT/US2013/033805, filed Mar. 26, 2013 and claims priority pursuant to Title 35 USC §119(e) to U.S. Provisional Application No. 61/616,725, filed Mar. 28, 2012, the entire specification and drawings of which are hereby incorporated by reference herein as if fully set forth herein.

BACKGROUND

This disclosure relates to a dampening mechanism for coaxially aligned relatively translatable components. More particularly, it relates to such a mechanism comprising a resilient monolithic member interposed between the relatively translatable components that provides dampening through elastic tensile deformation.

Telescoping components are employed in a variety of applications. One important example is found in personal support devices such as crutches, canes, ski poles, trekking poles, and the like. Many forms of such personal support devices include a resilient connection between coaxially aligned, connected tubular support shafts to cushion impact loading. Known forms of these devices employ a compression coil spring between the coaxial, relatively movable shaft segments that compresses on application of load to absorb shock and cushion the impact associated with use. Such springs are susceptible to buckling or other undesired characteristics associated with deformation, which, over time, deteriorate the spring function and overall utility of the device.

SUMMARY OF THE DISCLOSURE

The present disclosure is directed to an arrangement for a reciprocal connection between coaxial components of a support structure comprising an elastomeric element that absorbs load and develops a restoring force through tensile elongation.

The resilient element of the present disclosure is a molded member interposed between the relatively slidable ends of coaxially aligned telescoping support components. It provides resilient restoring force to the components through extension of the element in tension. It also provides a sleeve-like journal between the telescoping components to reduce frictional resistance and maintain coaxial alignment.

DETAILED DESCRIPTION

The dampening mechanism of the present disclosure is depicted in FIGS. 1 to 4. It includes a resilient elastomeric member having a monolithic body of molded polymeric material. It possesses the property of resilient elongation and develops an internal restoring force to return to its original configuration.

The dampening mechanism comprises a pair of coaxially aligned, telescoping components and an interposed resilient elastomeric member 50. The telescoping components comprise an outer component 102 and an inner component 104 illustrated here as telescoping cylindrical shafts.

It should be appreciated that though the illustrated embodiment discloses cylindrical shafts, the dampening mechanism is suitable for use in any configuration where relatively reciprocating telescoping components are employed. These components may have any desired cross-section, such as oval, square, rectangular or other geometric shape. Moreover, though the outer component 102 must be hollow to receive the inner component 104 in telescoping relation, the components need not have the same cross section. For example, the inner component may be square, or "T" shaped or other suitable cross section.

Figure 3:
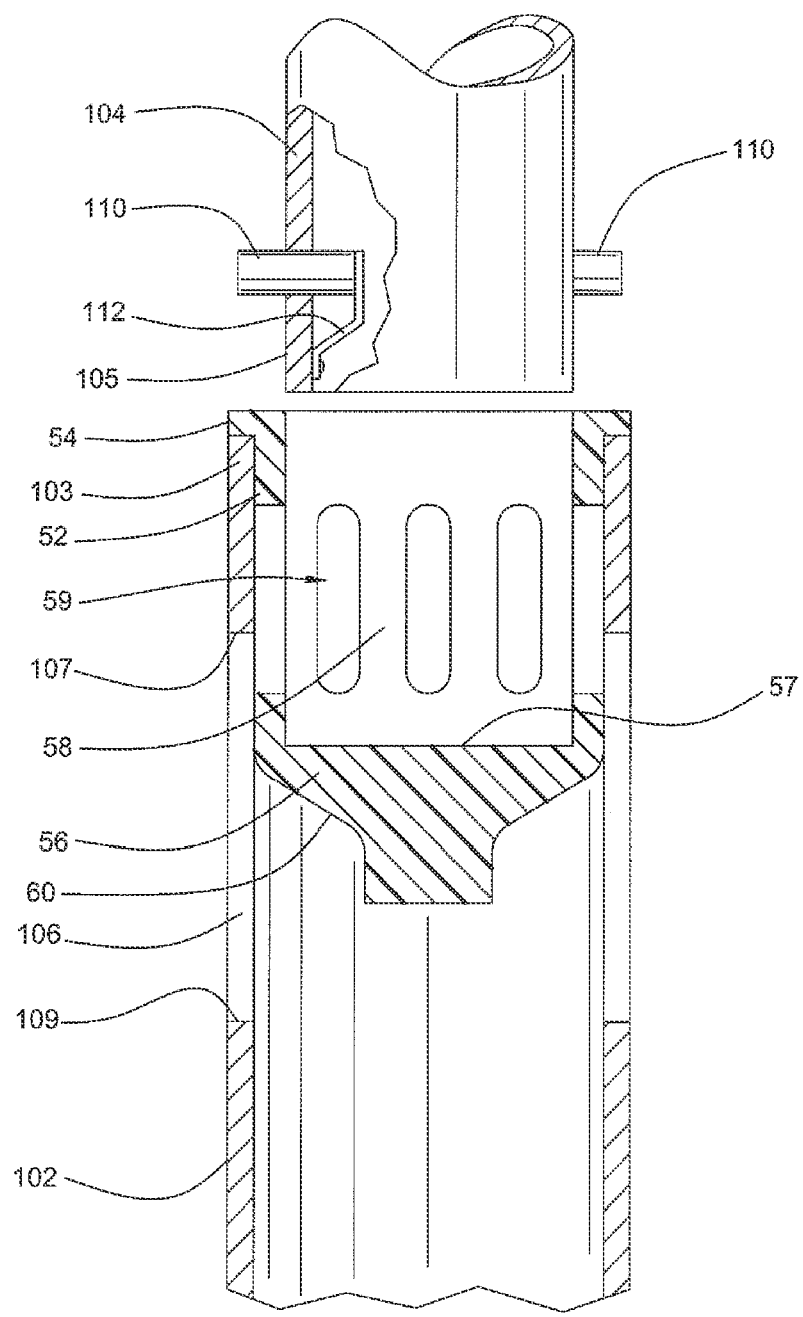
FIG. 3 is a plan view, in section, of the dampening mechanism installed between telescoping components, in an unstressed condition.
Figure 4:
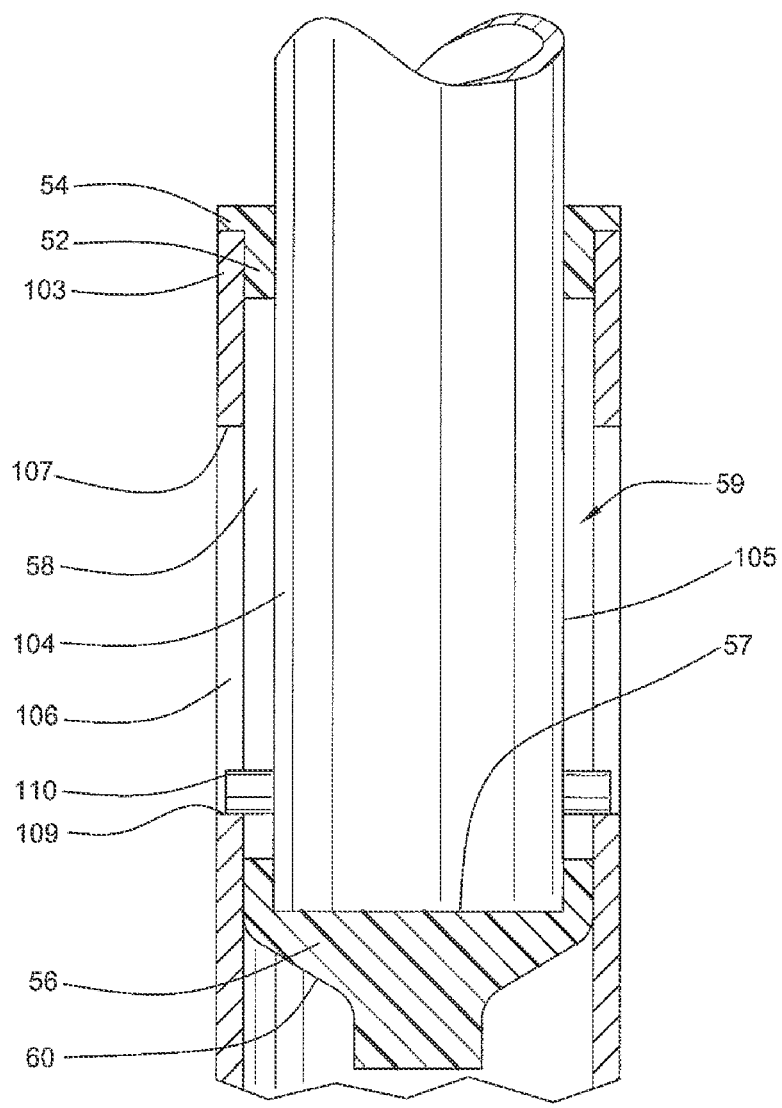
FIG. 4 is a plan view, in section, of the assembled telescoping components with the resilient elastomeric member in tension.

Resilient elastomeric member 50 is intended to be interposed between two coaxially aligned relatively translatable components, intended for use in a generally vertical orientation. As illustrated in FIGS. 3 and 4, such components may be tubular shafts arranged coaxially such that one is slidably retained within the other. Such shafts could, for example, form the leg of a crutch, or comprise a ski pole or trekking pole, or any other elongate structure where relative translative motion is desired to absorb shock due to impact loading of one shaft relative to the other.

Referring to FIGS. 3 and 4, the shaft assembly includes hollow tubular outer shaft or component 102 and an inner shaft or component 104. As stated, though illustrated as tubular, components 102 and 104 may be any suitable shape, or cross-section.

Figure 2:
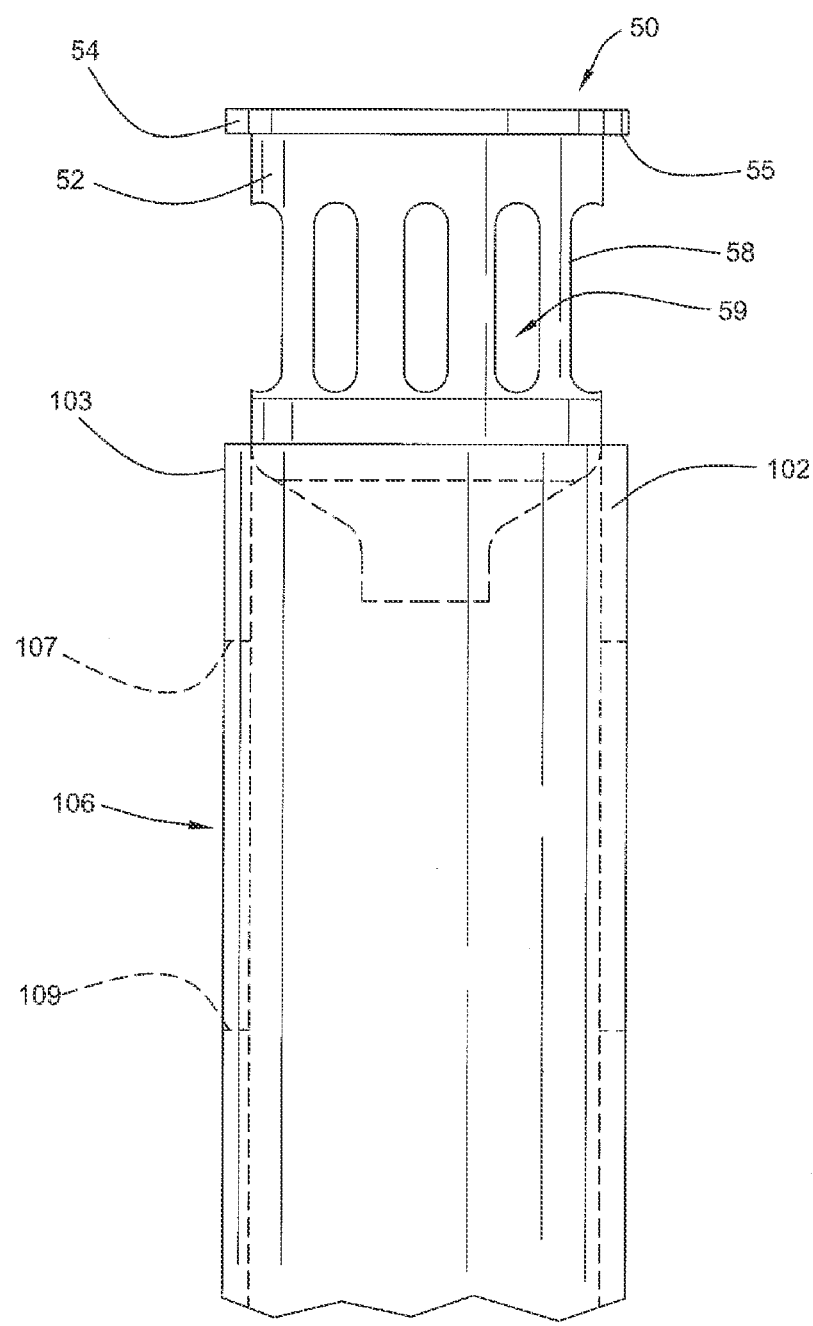
FIG. 2 is a plan view of the resilient elastomeric member of the dampening mechanism prior to insertion into one of a pair of telescoping components.

Referring to FIG. 2, illustrated outer shaft element 102 has an end 103 arranged to receive end 105 of coaxial inner shaft element 104 in a reciprocal slidable relation with the cylindrical body portion 52 of resilient elastomeric member 50 disposed internally of outer shaft element 102 and externally of inner shaft element 104.

As used herein the term axial means along the longitudinal axis of the shafts. Forward means in the direction of insertion of inner shaft element 104 into telescoping relation with outer shaft element 102. Rearward means in the opposite direction. The term radial means in a direction perpendicular to the longitudinal axis along which the telescoping elements are axially translatable. The terms radially inner or inward mean toward the longitudinal axis and radially outer or outward means in the opposite direction. As here illustrated, outer shaft element 102 is below and coaxial with inner shaft element 104. However, this configuration could be reversed with the inner shaft element 104 positioned below the outer shaft element 102.

As seen in FIGS. 2 to 4, outer shaft element 102 includes a pair of slots 106 disposed one hundred eighty degrees (180°) apart spaced below open end 103. Slots 106 have an upper terminus 107 and a lower terminus 109 which define the limit of relative translation between shafts 102 and 104 as will be explained.

Shaft 104 includes a pair of engagement pins 110 spaced from the end 105. As seen in FIG. 3, these pins are spring loaded radially outward by leaf springs 112 to be retractable radially into the shaft 104.

The shaft elements 102 and 104 are assembled together to form the shaft assembly by insertion of end 105 of inner shaft 104 into end 103 of outer shaft 102. The spring loaded pins 110 are pushed radially into shaft element 104 to pass into end 103 of shaft element 102. Pins 110 engage within slots 106 and spring radially outward into the slots to connect the shafts 102 and 104 in a coaxial relation with axial translation permitted between the limits defined by the upper and lower terminus 107 and 109 of slots 106.

Figure 1:
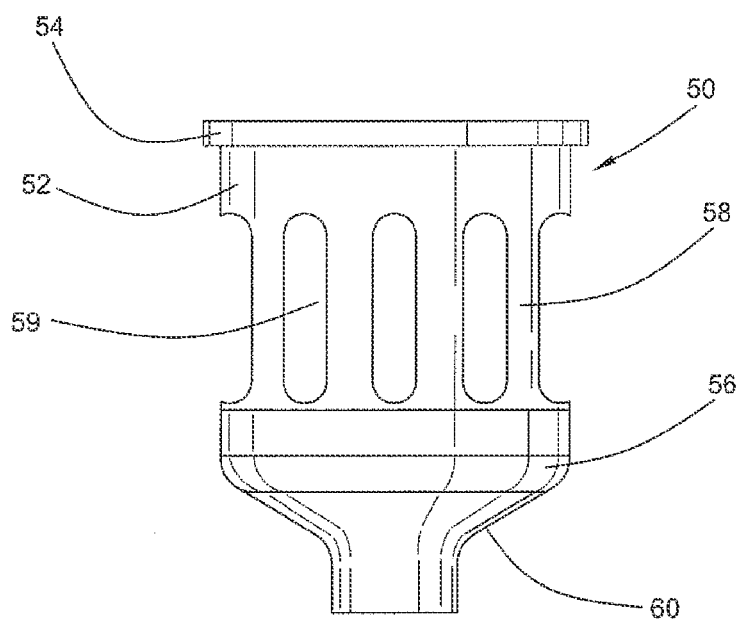
FIG. 1 is a plan view of the resilient elastomeric member of the present disclosure.

The resilient elastomeric member 50 of the assembly is shown in FIG. 1. It comprises a cylindrical molded monolithic body portion 52 having an attachment portion 54 and a support portion 56 connected by spaced elongate webs 58 forming voids 59. Attachment portion 54 is shown as a radially outward ring. It has a diameter somewhat larger than the diameter of cylindrical body portion 52 and is larger than the internal diameter of the outer shaft element 102.

Elastic energy absorbing resilient member 50 is molded from a polymeric material that provides the qualities of energy absorption on elongation and resiliency sufficient to restore it to its original shape after initial elongation. The element is designed via a proprietary ITW (Dahti) process that orients the crystalline structure of the device which increases tensile strength and adds the elasticity required to absorb energy. It is made available by ITW-Nexus, Des Plaines, Ill.

The resilient member 50 may be molded from a variety of materials depending on the requirements of a specific application. It may, for example, be molded from a TPE (Thermoplastic Elastomer) material such as a COPE (Copolyester) material or a TPU (Thermoplastic Urethane) material. Suitable materials are available from Du Pont under the Hytrel® trademark or other commercially competitive materials.

After molding, the resilient member 50 is processed by elongation of portions of the structure beyond the yield point to align the crystalline lamellae in one direction. Such processing may proceed as disclosed in U.S. Patent Publication 2012/0153536, published Jun. 21, 2012, and entitled "Predeformed Thermoplastic Spring and Method of Manufacture," the entire specification and drawings of which are hereby incorporated by reference herein as if fully set forth.

Referring to FIG. 2, resilient member 50 is sized such that the outer surface of cylindrical body portion 52 fits snugly within the end of outer tubular shaft 102. The radial outward ring portion or attachment portion 54 rests upon end 103 of tubular shaft 102 to fix the position of resilient member 50 within the shaft 102. In this regard, surface 55 of radial ring 54 serves as a retention or stop surface to limit axial movement of resilient elastomeric member 50 axially inward relative to shaft 102.

Best seen in FIG. 4, the inner diameter of resilient elastomeric member 50 is such that it snugly receives the outer diameter of inner shaft 104. When so inserted, inner shaft 104 is piloted within outer shaft 102 with end 105 resting upon support portion 56 with webs 58 captured between the inner surface of outer shaft 102 and outer surface of inner shaft 104.

Referring to FIG. 3, support portion 56 includes a radially inward directed internal wall surface 57. Wall surface 57 defines a retention or stop surface to limit the axial movement of shaft 104 into resilient elastomeric member 50.

External surface 60 of support portion 56 is somewhat conical or curvilinear and defines a tapered centering node. It provides a forward guide surface to facilitate insertion of resilient elastomeric member 50 into the end of hollow tubular shaft component 102.

Cylindrical body portion 56 and webs 58 of resilient elastomeric member 50 are disposed between the inner surface of the end 103 of outer shaft element 102 and the outer surface of end 105 of inner shaft element 104. Pins 110 extend through aligned voids 59 into slots 106. Note that the spaced elongate webs 58 define voids 59 which can be aligned with slots 106 in outer shaft 102 to permit disposition of pins 110 within slots 106.

In FIG. 3, the assembly is shown in exploded view. Once assembled, the inner shaft 104 resides coaxially within outer shaft 102. The axial length of cylindrical body portion 52 and webs 58 are such that the resilient elastomeric element 50 maintains pins 110 at the upper terminus 107 of slots 109. In this position, the resilient elastomeric member 50 may be stressed or elongated slightly to create a restoring force urging the inner component 104 in the outward direction.

On loading of shaft elements 102 and 104, inner shaft element 104 is urged further into outer shaft element 102, causing elongation of resilient elastomeric member 50. Such elongation continues until pins 110 reach the limit of travel within slots 106 and engage lower terminus 109 of slots 106. Such movement and resultant elongation of resilient elastomeric member 50 cushion the impact of the applied load and, through tensioning elongation, develop a restoring force within resilient elastomeric member 50. On removal of the applied load, the restoring force urges the inner shaft 104 to return to its original position with pins 110 at upper terminus 107 of slots 106.

Notably, the cylindrical body 52 and webs 58 of resilient elastomeric member 50 are disposed between the relatively translatable shafts 102 and 104 and provide a journaling effect to reduce friction between the relatively translatable shafts and maintain coaxial alignment.

The number of webs 58 may be varied to alter the resilient and damping properties of the mechanism to correlate with the expected impact loading experienced during use of the coaxially aligned, translatable shafts. The properties of the dampening mechanism can, therefore, be tuned to the particular application involved. Because the damping mechanism is elastomeric, it is not susceptible to deterioration due to exposure to moisture or other environmental conditions.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. A resilient elastomeric member for disposition between ends of coaxially aligned inner and outer components with ends disposed in axially translatable reciprocally slidable telescoping relation comprising:

an elastic energy absorbing hollow elastomeric body having an inner surface sized to receive the end of the inner component and an outer surface sized for disposition within the end of the outer component, said hollow elastomeric body including an attachment portion for securement to the outer component and a support portion for supporting the inner component, said attachment portion comprising a continuous ring extending radially outward of said attachment portion to limit movement of said body relative to said outer component, wherein said elastic energy absorbing hollow elastomeric body elongates to absorb energy on reciprocal movement of the end of the inner component into the end of the outer component and possesses sufficient resiliency to return to its original shape after the elongation force is removed.

2. A resilient elastomeric member as claimed in claim 1 wherein said hollow elastomeric body includes a plurality of spaced webs extending between said attachment portion and said support portion, separated by voids.

3. A resilient elastomeric member as claimed in claim 2 wherein said hollow elastomeric body is generally cylindrical and said webs are disposed equally spaced about said attachment portion and said support portion.

4. A resilient elastomeric member as claimed in claim 3 wherein said support defines an inwardly directed retention surface to limit insertion of the inner component.

5. A resilient elastomeric member as claimed in claim 4 wherein said body is sized to frictionally engage the interior of the outer component and the exterior of the inner component.

6. A resilient elastomeric member as claimed in claim 1 wherein said body comprises a polymeric material having a crystalline structure elongated after molding to orient the crystalline structure of said body.

7. An elastomeric element as claimed in claim 3 wherein said body comprises a polymeric material having a crystalline structure elongated after molding to orient the crystalline structure of said body.

8. An elastomeric element as claimed in claim 5 wherein said body comprises a polymeric material having a crystalline structure elongated after molding to orient the crystalline structure of said body.

9. A dampening mechanism between ends of an outer component and an inner component disposed in axially translatable reciprocally slidable telescoping relation, having an interposed resilient elastomeric member comprising:
an elastic energy absorbing hollow elastomeric body having an inner surface surrounding an outer surface of said end of said inner component and
an outer surface disposed within an inner surface of said end of said outer component, and
including an attachment portion secured to said end of said outer component and a support portion supporting said end of said inner component,
wherein said elastic energy absorbing hollow elastomeric body elongates to absorb energy on reciprocal movement of the end of the inner component into the end of the outer component and possesses sufficient resiliency to return to its original shape after the elongation force is removed.

10. A dampening mechanism as claimed in claim 9 wherein said hollow elastomeric body includes a plurality of spaced webs disposed between said outer surface of said inner component and said inner surface of said outer component extending between said attachment portion and said support portion, separated by voids.

11. A dampening mechanism as claimed in claim 10 wherein said hollow elastomeric body is generally cylindrical and said webs are disposed equally spaced about said attachment portion and said support portion, with said webs disposed between said telescoping ends of said inner component and said outer component.

12. A dampening mechanism as claimed in claim 11 wherein said attachment portion defines an outwardly directed retention surface to limit movement of said elastomeric member relative to the end of said outer component.

13. A dampening mechanism as claimed in claim 12 wherein said attachment portion comprises a continuous ring extending radially outward of said attachment portion.

14. A dampening mechanism as claimed in claim 12 wherein said support portion defines an inwardly directed retention surface to limit insertion of the end of said inner component into said support portion.

15. A dampening mechanism as claimed in claim 14 wherein said body is sized to frictionally engage the inner surface of outer component and the outer surface of the inner component, and one of said telescoping ends includes at least one slot having an upper terminus and a lower terminus spaced in the direction of relative axial translation of said components and the other thereof includes at least one pin disposed in said slot slidable between said upper terminus and said lower terminus.

16. A dampening mechanism as claimed in claim 9 wherein said body comprises a polymeric material having a crystalline structure elongated after molding to orient the crystalline structure of said body.

17. A dampening mechanism as claimed in claim 10 wherein said body comprises a polymeric material having a crystalline structure elongated after molding to orient the crystalline structure of said body.

18. A dampening mechanism as claimed in claim 12 wherein said monolithic body comprises a polymeric material having a crystalline structure elongated after molding to orient the crystalline structure of said body.

19. A dampening mechanism as claimed in claim 9, wherein said body is sized to frictionally engage the outer surface of the end of said inner component and the inner surface of the end of said outer component, one of said telescoping ends including at least one slot having an upper terminus and a lower terminus spaced in the direction of relative axial translation of said components and the other thereof including at least one pin disposed in said slot and slidable therein between said spaced upper and lower terminus of said at least one slot.

* * * * *